Patented Aug. 9, 1932

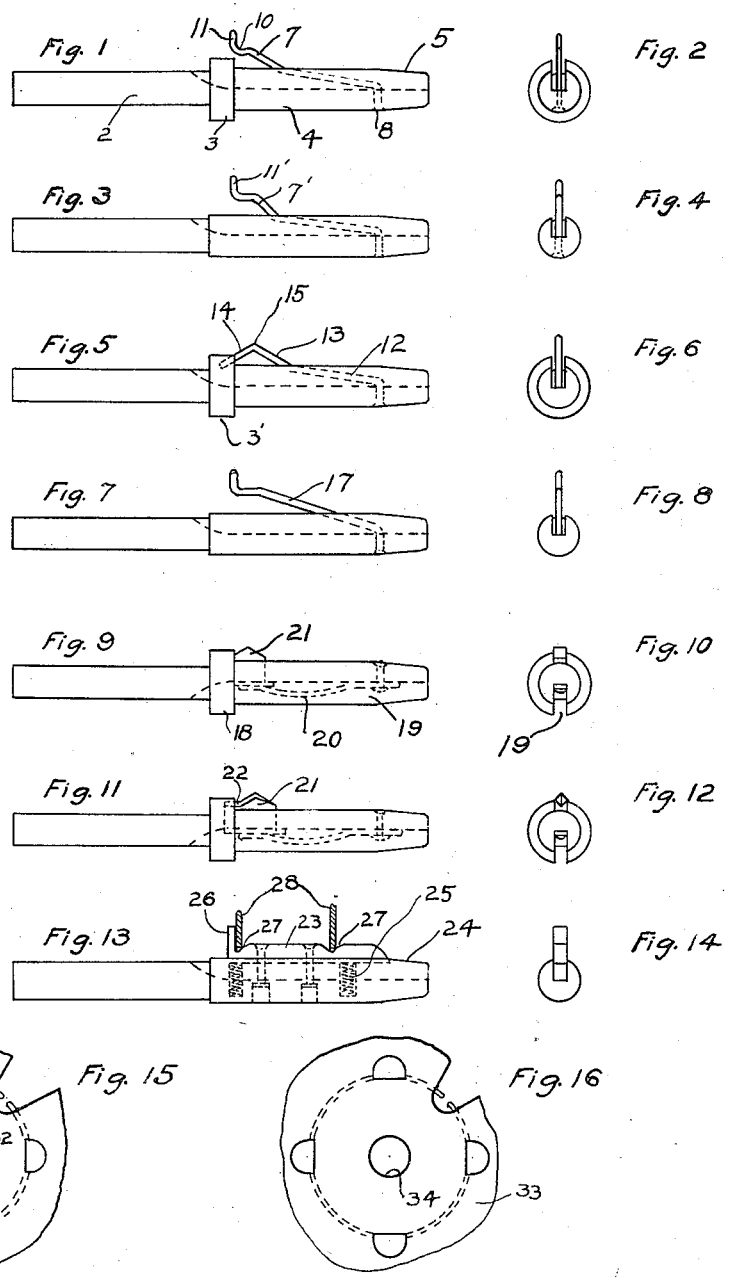

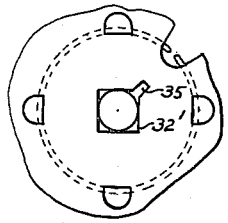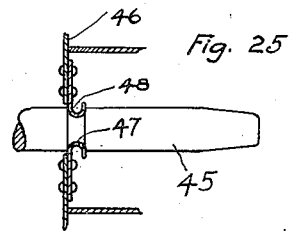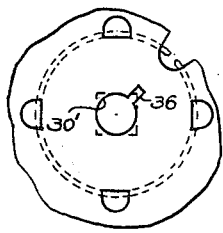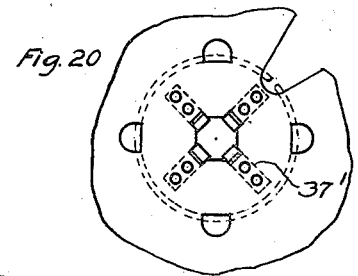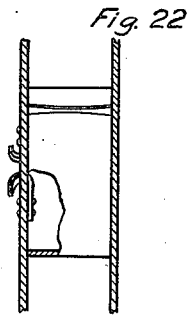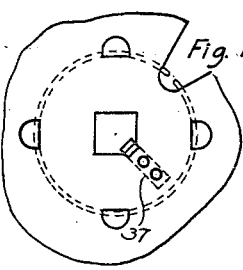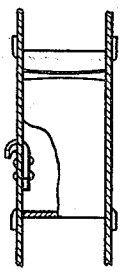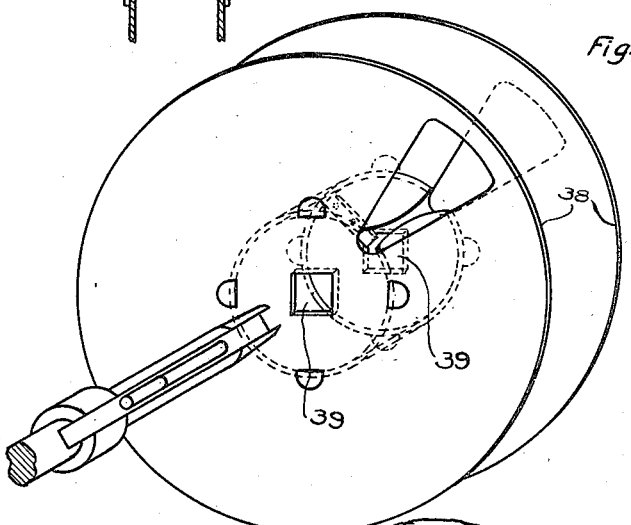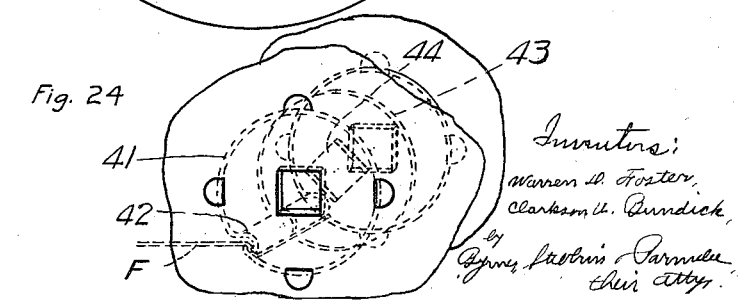

1,871,230

UNITED STATES PATENT OFFICE

WARREN DUNHAM FOSTER, OF WASHINGTON TOWNSHIP, BERGEN COUNTY, NEW JERSEY, AND CLARKSON ULYSSES BUNDICK, OF WHITE PLAINS, NEW YORK, ASSIGNORS, BY MESNE ASSIGNMENTS, TO KINATOME PATENTS CORPORATION, OF NEW YORK, N. Y., A CORPORATION OF NEW YORK

CARRIER FOR MATERIAL AND SPINDLE THEREFOR

Application filed February 23, 1927. Serial No. 170,181.

This invention relates broadly to the art of winding and reeling and more particularly to an improved structure particularly adapted to serve as a carrier either for delivering or receiving film for photographic apparatus, film printing apparatus or the like, in which it is desirable to pass the film from one reel or carrier to another.

It has been proposed in the art to which the present invention relates to provide apparatus of the general character referred to either with special spindles or mounts, or with special reels or carriers or both, with the object in view either of providing carriers whose utility is limited to use with a particular apparatus, or the structure of which is such that it can only be applied to such apparatus in a predetermined manner.

It is obviously desirable for many reasons to provide a carrier and mounting therefor of such nature that the owner or operator of a given apparatus is not restricted with respect to his selection of pictures by reason of special carriers or mountings therefor, and the present invention has for one of its objects to provide an improved mounting adapted to cooperate with the different types of carriers at present available as well as with improved carriers of the general nature hereinafter referred to. By reason of such a construction, an operator may select films without restriction by reason of the character of carrier with which they are supplied. This applies equally as well to either so-called negatives or positives, the invention being adaptable for use with either, and the term "picture" as utilized herein, or "film," being generic in this respect.

For certain operations it is sometimes desirable to be able to position a carrier on a support with either side outwardly. This is the case where for any reason a film becomes wound on a carrier in reverse direction so that a change in the position of the reel is necessary. With standard constructions now in use, the reversal of the reels is frequently prohibited either by reason of the reel structure or the spindle with which it cooperates.

The present invention is exemplified and illustrated in the accompanying drawings in connection with a spindle adapted for use in a photographic apparatus, together with a carrier adapted for similar use. It will be apparent, however, that the utility of the invention is not limited in this respect, and that certain features of the invention are adaptable to the winding or reeling of a wide variety of materials.

In the accompanying drawings, Fig. 1 is a side elevation of one form of spindle and Fig. 2 is an end elevation thereof;

Fig. 3 is a view similar to Fig. 1 illustrating another embodiment of the invention;

Fig. 4 is an end view of the construction shown in Fig. 3;

Figs. 5 to 14 both inclusive are views similar to those previously referred to, but illustrating different embodiments of the invention;

Fig. 15 is a partial side elevational view of one form of reel adapted for use with one of the spindles illustrated;

Fig. 16 is a view similar to Fig. 15 showing a slightly different form of reel structure;

Figs. 17 to 20 both inclusive, are views similar to Figs. 15 and 16 showing still further embodiments of the invention;

Fig. 21 is a transverse sectional view through a reel of the type shown in Fig. 19;

Fig. 22 is a transverse sectional view through a reel of the type shown in Fig. 20;

Fig. 23 is an exploded perspective view showing a reel in position to be applied to a spindle;

Fig. 24 is a perspective view partly broken away illustrating a portion of a hub structure adaptable for use with reels of any desired construction, and capable of being used with spindles of the character herein referred to or of the character generally in use in this type of apparatus; and, Fig. 25 is a partial longitudinal sectional view through a spindle and carrier, both of modified construction illustrating the cooperative compensating positioning and driving relationship established therebetween.

In carrying out the present invention, it is not only necessary to provide a spindle adaptable for use with the wide variety of reels available, but it is also essential that the spindle embody means for establishing a suitable driving connection with the carrier or reel mounted thereon, such means preferably also serving to both properly position the carrier on the spindle and also to maintain it in the required position during the operation thereof.

It is also desirable that the construction be such that it is adapted to quantity production at a relatively low cost, and that it may be used by unskilled operators without difficulty.

It is also desirable that the construction of the spindle and carrier be such as to prevent any rubbing between the carrier and a relatively stationary part of the apparatus with which it is used, and that the driving and positioning connection between the spindle and carrier be such as to permit the carrier to move relatively to the spindle under predetermined conditions thereby preventing injury to the material being delivered from or to the carrier.

In accordance with the present invention, the driving and positioning means preferably comprises the same element, its construction being such as to provide a frictional driving connection between the carrier and spindle to insure the safety of operation referred to, and the spindle preferably comprises a carrier mount surface of uniform or substantially uniform cross-sectional area throughout the portion thereof embraced by the carrier when in position thereon. With such a construction the maximum diameter of the spindle may be determined with respect to the minimum diameter of openings now provided in reels, and suitable compensating means may be utilized to serve in the capacity of take-up means between the spindle and carrier preventing undue tilting or twisting movement therebetween.

The various spindles illustrated herein possess the advantageous features of construction referred to, and the following specification clearly points out their adaptability for use with reels of widely different characteristics with respect to the spindle receiving openings formed therein.

Referring to the construction illustrated in Fig. 1, there is shown a spindle 2 having an intermediate collar 3 formed thereon, beyond the collar the spindle being formed with a collar receiving or mount portion 4 preferably substantially cylindrical throughout the entire length thereof and of substantially uniform diameter. The outer end of the spindle may, if desired, be tapered as indicated at 5 to facilitate the initial entry of the spindle into the carrier as will be understood. Extending longitudinally of a portion of the spindle is a groove within which is mounted in any desired manner a combined positioning, holding and driving means 7 herein illustrated as comprising a spring member free at one end and having its opposite end 8 suitably secured in the spindle. This member intermediate its ends is provided with an inclined portion terminating in a seat 10 from which an angular projection 11 may extend.

In slipping a carrier into position over the spindle, the member 7 is engaged by one of the openings in one of the side walls of the carrier as it comes into contact with the inclined portion and is gradually depressed to the extent required to permit the carrier to slide into position. This depressing operation continues until the reel occupies the desired position on the depressed or recessed seat 10, the limit of movement being determined either by the collar 3 or such angular portion 11 depending upon the exact position of the angular portion with respect to the outer phase of the collar. Where the collar actually limits the relative travel between the spindle and the collar during the movement of the same to cooperative position, its function is merely one of providing an increased area of contact between the spindle and carrier whereby tilting movement of the collar is made more difficult. The inherent spring tendency of the member 7 causes it to always tend to move outwardly relatively to the spindle axis whereby an effective compensation is provided for any difference in diameter between the diameter of the opening through the carrier and the diameter of the spindle. At the same time, it provides sufficient frictional contact between the spindle and the carrier irrespective of the shape of the opening in the carrier whereby the spindle may serve as a driving means therefor, the maximum torque which can be exerted by the spindle on the reel being limited by the friction whereby in the event the film or other material being handled becomes caught, the carrier may slip relatively to the spindle to prevent injury to such material. The member 7 further, by reason of this frictional engagement tends to hold the carrier in proper position against possibility of accidental movement thereof axially of the spindle.

In Figs. 3 and 4 there is illustrated a form of spindle similar to that previously described with the exception that the collar 3 is entirely omitted whereby the angular end portion 11' on the member 7' constitutes the sole means for limiting the movement of the carrier inwardly onto the spindle.

In Figs. 5 and 6 there is shown a spindle having a collar 3' with which cooperates a spring member 12. This spring member is shaped not only to provide an upwardly inclined portion 13 but also a terminal portion 14 bent downwardly so as to extend inwardly toward the axis of the spindle. By reason of this construction, during the placing of a carrier in position on the spindle, after the inner side of the carrier passes the high point 15, the member 12 tends by reason of its outward movement to move the carrier axially onto the spindle and into engagement with the shoulder 3', its action being such as to effectively maintain the carrier in this position while exerting the desired compensating influence before referred to in addition to its holding and driving action.

In Figs. 7 and 8 the form of spindle is generally similar to that illustrated in Figs. 3 and 4 with the exception that the inclined portion 17 is more gradual, thereby facilitating the positioning of a carrier on the spindle.

In some cases it is desirable to provide a positioning, holding and driving means in the form of a separate latch movable yieldingly in a truly radial direction with respect to the spindle. In Figs. 9 to 14 both inclusive, there are illustrated modifications by reason of which such an operation can be obtained. Referring more particularly to Figs. 9 and 10, the spindle is provided with an intermediate collar 18 and with a longitudinally extending groove 19. Within the groove is suitably mounted a flat spring 20 the inner end of which underlies a latch 21 having its collar engaging end shaped in a manner similar to that described in connection with Fig. 5, and operating similarly thereto.

The form of Figs. 11 and 12 differs from the embodiment just described in the provision of a latch 21' having a seat 22 definitely formed thereon for receiving the inner wall of the carrier.

The modification illustrated in Figs. 13 and 14 is designed to compensate for differences in diameter of an opening in the reel relative to the diameter of the spindle on one or both sides of the reel, or to accommodate itself to a reel having an opening of varying contour throughout the different portions thereof. This modification comprises an elongated latch 23 normally urged outwardly in the slot 24 by means of springs 25. The latch is provided with a terminal portion 26 similar to the portion 11' of Fig. 3, for limiting the travel of the carrier onto the spindle. The latch is also provided at suitable portions with different seats 27 adapted to engage the side walls 28 of a carrier as indicated in dotted lines to more effectively hold the same in position. It will be apparent that different ends of the latch may move outwardly varying amounts, and thereby compensate for differences in diameter between the openings in either or both of the reel walls and the outer diameter of the mount portion of the spindle.

Fig. 15 illustrates in side elevation a portion of a reel wherein one of the side walls 29 is provided with a circular opening 30, while the other side wall 31 is provided with a rectangular opening 32. Reels having this construction are at present utilized with spindles having a mount portion of changing cross-section throughout different portions thereof, the change being such that it is impossible to place the carrier on the spindle either side first. In accordance with the present invention and with any of the spindles illustrated in Figs. 1 to 14 such a reel may be effectively used irrespective of which side is first applied to the spindle.

Inasmuch, also, as spindles constructed in accordance with the present invention are substantially cylindrical throughout their length, and are not provided with any mount portions of angular cross-section, the reels may be slipped readily onto the spindles without reference to the angular position of the square opening 32. This makes the invention particularly adaptable for use with construction such as shown for example in the patent to Ponting and Ford, 1,440,173, granted December 26, 1923. With the carriers within a casing as illustrated, for example, in this patent, no difficulty is encountered in slipping the device as a unit into position, the spindles automatically accommodating themselves to the contour of the openings in the reels irrespective of the position rotatively which the reels occupy within the casing.

In Fig. 16 there is shown by way of illustration only a portion of a reel in which both of the side walls 33 are formed with a circular opening 34. The spring pressed members described effectively engage such openings, irrespective of their actual diameter, and by frictional contact therewith serve to position, hold and drive the same. It will be understood that if desired any of the forms of spring members or latches described may be provided with serrated or roughened portions where they engage the carriers to increase the frictional drive which may be transmitted through the spindles to the reels.

In Fig. 17 there is illustrated a reel generally similar to that shown in Fig. 15, with the exception that the angular opening 32' is formed at some portion thereof with a slot 35 extending preferably in a generally radial direction and communicating with the opening. Such a construction may be desirable in the case of comparatively large carriers or carriers adapted for the handling of relatively heavy material wherein a friction drive may not be sufficient. With such an arrangement, the reel or carrier may be slipped onto the spindle in any position, the spring pressed member automatically passing into the slot upon relative rotation after positioning, between the spindle and carrier. The reel of Fig. 18 is likewise similar to the reel of Fig. 15 with the exception that the circular opening 30' is provided with a slot 36 similar to that referred to and operating in the same manner.

Fig. 19 shows still a further modification of a reel such as illustrated in Fig. 15, this modification comprising compensating means 37 carried by the reel itself and projecting into one of the openings as clearly shown in Fig. 20, the portion which projects into the opening being of spring material adapted to be deflected by the spindle to the extent required to compensate for differences between the spindle diameter and the dimensions of the reel openings. This construction has been found to be of particular advantage in connection with a reel having either one or more angular openings. The reel of Fig. 19 is illustrated as having one round and one angular opening while in Fig. 23 there is shown a reel in which both of the sides 38 are provided with angular openings 39. Either one or both of these openings may be provided with yielding compensating means of the character referred to, the compensating means being automatically effective during the mounting of a carrier in position on a spindle.

Fig. 20 illustrates a reel having a plurality of compensating means 37' cooperating with one of the openings and extending into and through the same, while Fig. 22 illustrates in section a slightly modified embodiment in which the compensating means 40 are located within the hub of the carrier in position to cooperate with a spindle but not in such position as to extend into the spindle receiving openings in the side walls of the carrier.

In Fig. 24 there is illustrated still another embodiment of the invention in which the hub 41 which is usually constructed of sheet metal is formed with a depression 42 adapted to serve as the guiding means for a shiftable compensating means in the form of a disk 43 having a spindle receiving opening 44 therein which opening is either a compromise as to contour between the other openings in the carrier or so located with respect thereto that as the carrier is slipped into position on the spindle the shiftable compensating means will be engaged thereby and bodily shifted along the guide 42 into a position where it engages the spindle sufficiently tightly to hold the same in position. It will be obvious that the opening 44 may be round, square or polygonal. As indicated, the hub 41 may be so shaped as to permit the depression 42 to also serve as an attaching means for one end of the film F as indicated in the drawings.

In the forms of the invention heretofore described and illustrated the spindle has been provided with the means for axially positioning the carrier relatively thereto. In Fig. 25 such axial positioning means is illustrated as comprising a cooperative relationship between the spindle 45 and the carrier 46. This relationship may be established for example, by providing the spindle with a circumferentially extending depression 47 with which the spring compensating means 48 engage. By reason of this engagement, they tend to hold the carrier against relative axial displacement along the spindle and also compensate for variations between the dimensions of the spindle and the dimensions of the opening 49, for example, in the carrier. By reason of their frictional engagement with the spindle, a frictional drive is established between the parts when they are in operative position.

It will be apparent that each form of the invention herein illustrated, whether with respect to the spindle or the hub is of such construction that a carrier of different characteristics may be readily placed in position on a spindle, either side first, either the spindle or carrier or both having compensating means adapted not only to effect the desired positioning of the carrier relatively to the spindle, but the maintaining of the desired relationship during operation. Such means further cooperate to effect the desired driving relationship between the parts. This constitutes one of the advantages of the present invention.

With certain forms of spindles illustrated herein, a single means serves in the triple capacity set forth, thereby automatically accomplishing all the necessary operations at a minimum cost and with a comparatively simple structure. This constitutes a further advantage of the present invention.

The construction of spindle herein illustrated either with or without an intermediate collar, but with a collar mount portion preferably substantially cylindrical throughout its length and of substantially the same cross-sectional area, enables the spindle to be universally used with reels of widely differing characteristics, thereby providing a supporting means which when utilized in any apparatus renders that apparatus independent of use with any specified form of collar. This constitutes a still further advantage of the invention in that it enables an operator to easily mount a carrier without regard to its construction and enables him to choose films or the like irrespective of the type of carrier on which they are mounted.

A still further advantage arises from the fact that each of the carriers herein disclosed is of such construction that it in turn may be utilized either with spindles having the characteristics herein shown or with a large number of standard spindles now on the market. With a form such, for example, as that illustrated in Fig. 23, the carrier is adapted for use with spindles of special construction having an abrupt change of section or configuration intermediate the ends, as will be clearly apparent.

We claim:

1. As an article of manufacture, a spindle adapted to cooperate with different carriers having side plates with openings of different dimensions, for the reception of a spindle, said spindle including means movably mounted upon said spindle, automatically operative when the carrier is placed upon the spindle, for establishing a driving connection between said spindle and said carrier and for positioning said carrier against axial movement in either direction, said positioning means including a resilient member mounted on said spindle for movement relatively thereto, said member having formations for operatively engaging one of the side plates of said carrier at points thereon adjacent portions of each side thereof peripheral to said spindle receiving opening therein, one of said formations, when the carrier and reel are in assembled relation, being disposed between said plate and the spindle receiving end of said spindle and another thereof being disposed upon the other side of said plate whereby movement of said carrier in either direction is impeded.

2. As an article of manufacture, a spindle adapted to cooperate with different carriers having side plates with openings of different dimensions for the reception of a spindle, said spindle constructed for the removable mounting of a carrier thereupon over an end thereof and including a member mounted thereon which is automatically effective upon the placing of the carrier upon the spindle for both establishing a yielding driving connection between said spindle and said carrier and for establishing a predetermined position for said carrier upon said spindle, for limiting the movement of the carrier in each direction, said member being mounted upon said spindle for movement relatively thereto and extending away from the outer end of said spindle, said member including a first surface which is inclined away from said spindle at an acute angle thereto, a second surface inclined away from the direction of said first named surface at an acute angle thereto and extending toward said spindle, and a third surface inclined away from said spindle at approximately a right angle to the axis thereof.

3. As an article of manufacture, a spindle adapted to cooperate with different carriers having side plates with openings of different dimensions in different of said carriers, said spindle including movably mounted means automatically effective upon the placing of the carrier upon the spindle for establishing a driving connection between said spindle and said carrier and for positioning said carrier against axial movement in either direction and for compensating for dimensional differences in the said openings in the said side plates, said positioning means comprising a resilient member mounted on said spindle for movement relative thereto, said resilient member having a concave formation arranged for engaging the portion of one of said side plates of said carrier adjacent said spindle receiving opening, the bottom of said concave formation engaging the periphery of the spindle receiving opening, and the upwardly sloping side wall portions of said concave formation being disposed on each side of said side plate when said carrier is in assembled relation with said spindle.

4. A spindle constructed for the removable mounting of a carrier thereupon over an end thereof, said spindle including a member mounted thereupon for movement relatively thereto and adapted to position the carrier upon the spindle and to drive it therefrom, said member comprising a carrier mount surface substantially parallel to the axis of the spindle and an extension therefrom normal thereto relatively distant from said end of the spindle and adapted to limit the movement of the carrier along the axis of the spindle in the direction away from said end.

5. A spindle constructed for the removable mounting of a carrier thereupon over an end thereof, said spindle including a member resiliently mounted thereupon for bodily movement relatively thereto and adapted to position the carrier upon the spindle and drive it therefrom, said member comprising a carrier mount surface substantially parallel to the axis of the spindle and an extension therefrom normal thereto relatively distant from said end of the spindle and adapted to limit the movement of the carrier along the axis of the spindle in the direction away from said end.

6. A spindle constructed for the removable mounting of a carrier thereupon over an end thereof, said spindle including a longitudinal slot and a member mounted therein for movement relatively to said spindle, said member comprising a carrier mount surface substantially parallel to the axis of the spindle and an extension therefrom normal thereto relatively distant from said end of the spindle and adapted to limit the movement of the carrier along the axis of the spindle in the direction away from said end.

7. In combination, a spindle constructed for the removable mounting of a carrier thereupon over an end thereof, and a carrier, said carrier including axially spaced side plates having spindle receiving openings therein, and said spindle including a member mounted thereupon for movement relatively thereto, said member comprising a carrier mount surface substantially parallel to the axis of the spindle, an extension therefrom normal thereto relatively distant from said end of the spindle and adapted to limit the movement of the carrier along the axis of the spindle in the direction away from said end, and means for seating the periphery of the opening in at least one of said side plates of the carrier upon said carrier mount surface.

8. In combination, a spindle constructed for the removable mounting of a carrier thereupon over an end thereof, and a carrier, said carrier including axially spaced side plates having spindle receiving openings therein, and said spindle including a longitudinal slot and a member mounted therein for movement relatively to said spindle, said member comprising a carrier mount surface substantially parallel to the axis of the spindle, an extension therefrom normal thereto relatively distant from said end of the spindle and adapted to limit the movement of the carrier along the axis of the spindle in the direction away from said end, and means for seating the periphery of the opening in at least one of said side plates of the carrier upon said carrier mount surface.

9. In combination, a spindle constructed for the removable mounting of a carrier thereupon over an end thereof, and a carrier, said carrier including axially spaced side plates having spindle receiving openings therein, and said spindle including a member resiliently mounted thereupon for movement relatively thereto, said member comprising a carrier mount surface substantially parallel to the axis of the spindle, an extension therefrom normal thereto relatively distant from said end of the spindle and adapted to limit the movement of the carrier along the axis of the spindle in the direction away from said end, and means for positioning the periphery of the opening in at least one of said side plates of the carrier upon said carrier mount surface.

10. As an article of manufacture, a spindle adapted for the removable mounting of a carrier thereupon over an end thereof, a carrier for cooperation with said spindle, and movably mounted means for both establishing a driving connection between said spindle and said carrier and for limiting the movement of said carrier in a direction away from such end of said spindle as it is placed upon said spindle, said means including a member mounted upon said spindle for movement relatively thereto, said member including a first surface, relatively adjacent such end of said spindle over which said carrier is mounted, which is inclined away from the axis of said spindle at an acute angle thereto, and a second surface, relatively remote from such end of said spindle, which is inclined away from said spindle at substantially a right angle to the axis thereof.

11. As an article of manufacture, a spindle adapted for the removable mounting of a carrier thereupon over an end thereof, a carrier for cooperation with said spindle, and movably mounted means for both establishing a driving connection between said spindle and said carrier and for limiting the movement of said carrier in a direction away from such end of said spindle as it is placed upon said spindle, said means including a member mounted upon said spindle for movement relatively thereto, said member comprising a first surface, relatively adjacent such end of said spindle over which said carrier is mounted, which is inclined away from the axis of said spindle at an acute angle thereto, a second surface, relatively remote from such end of said spindle, which is inclined away from said spindle at substantially a right angle to the axis thereof, and a surface positioned intermediate said first and second surfaces and substantially parallel with such axis of said spindle.

12. As an article of manufacture, a spindle adapted for the removable mounting of a carrier over and end thereof, a carrier for cooperation with said spindle, said carrier comprising a hub and two side plates supported thereby in spaced parallelism thereto, said side plates and said hub having coaxial openings for the reception of said spindle, and a resilient member for maintaining said carrier upon said spindle in a pre-determined relation thereto, said member being mounted in a groove, formed in said spindle parallel to the axis thereof, at a point therein substantially adjacent the end of said spindle over which said carrier is mounted, said spindle being provided with such a groove, said member including a first surface which extends away from said spindle at such point of mounting at an acute angle to the axis of said spindle and out of said groove and a second surface, relatively remote from such point of mounting, which extends away from said spindle at approximately a right angle to the axis thereof, said first surface being adapted to engage the opening in one of said side plates and thereby position said carrier in a pre-determined radial relation to said spindle and said second surface being adapted to engage said side plate and thereby maintain said carrier in a pre-determined axial relation to said carrier.

13. As an article of manufacture, a spindle adapted for the removable mounting of a carrier over an end thereof, a carrier for cooperation with said spindle, and a spring wire for maintaining said carrier upon said spindle in a pre-determined relation thereto, said wire being mounted in a groove, formed in said spindle parallel to the axis thereof, at a point therein relatively adjacent the end of said spindle over which said carrier is mounted, said spindle being formed with such a groove, said wire first being inclined away from said spindle at an acute angle to the axis thereof, and thereafter being bent in a direction away from said spindle and at substantially a right angle to the axis thereof.

14. As an article of manufacture, a spindle adapted for the removable mounting of a carrier over an end thereof, a carrier for cooperation with said spindle, and a spring wire for maintaining said carrier upon said spindle in a predetermined relation thereto, said wire being mounted in a groove, formed in said spindle parallel to the axis thereof, at a point therein relatively adjacent the end of said spindle over which said carrier is mounted, said spindle being provided with such a groove, said wire first being inclined away from said spindle at an acute angle to the axis thereof, second being bent in a direction substantially parallel to the axis of said spindle and third being bent in a direction substantially at right angles to such axis.

In testimony whereof we have hereunto set our hands.

WARREN DUNHAM FOSTER.
CLARKSON ULYSSES BUNDICK.